US008442852B2

(12) United States Patent
Sun et al.

(10) Patent No.: US 8,442,852 B2
(45) Date of Patent: May 14, 2013

(54) WORKFLOW AUTO GENERATION FROM USER CONSTRAINTS AND HIERARCHICAL DEPENDENCE GRAPHS FOR WORKFLOWS

(75) Inventors: Tong Sun, Penfield, NY (US); John O. Walker, Rochester, NY (US); Shriram V. Revankar, Webster, NY (US); Narasimha Raju Gottumukkala, Ruston, LA (US)

(73) Assignee: Xerox Corporation, Norwalk, CT (US)

( * ) Notice: Subject to any disclaimer, the term of this patent is extended or adjusted under 35 U.S.C. 154(b) by 757 days.

(21) Appl. No.: 11/939,924

(22) Filed: Nov. 14, 2007

(65) Prior Publication Data

US 2008/0065455 A1 Mar. 13, 2008

Related U.S. Application Data

(62) Division of application No. 10/836,298, filed on Apr. 30, 2004, now abandoned.

(51) Int. Cl.
*G06Q 10/00* (2012.01)

(52) U.S. Cl.
USPC ........... 705/7.27; 705/7.26; 358/1.1; 715/771

(58) Field of Classification Search .................. 705/7.26, 705/7.27; 358/1.1; 715/771
See application file for complete search history.

(56) References Cited

U.S. PATENT DOCUMENTS

| 5,140,537 A | 8/1992 | Tullis |
| 5,630,069 A | 5/1997 | Flores et al. |
| 5,819,270 A | 10/1998 | Malone et al. |
| 5,940,816 A | 8/1999 | Fuhrer et al. |
| 6,060,101 A | 5/2000 | Erasmus et al. |
| 6,070,163 A | 5/2000 | Malone et al. |
| 6,115,640 A | 9/2000 | Tarumi |
| 6,278,901 B1 | 8/2001 | Winner et al. |
| 6,279,009 B1 | 8/2001 | Smirnov et al. |
| 6,299,063 B1 | 10/2001 | Freeman |
| 6,321,133 B1 | 11/2001 | Smirnov et al. |
| 6,349,298 B1 | 2/2002 | Malone et al. |
| 6,546,364 B1 | 4/2003 | Smirnov et al. |
| 6,725,428 B1 | 4/2004 | Pareschi et al. |
| 7,653,562 B2 * | 1/2010 | Schulz et al. ................ 705/7.27 |
| 2002/0071134 A1 * | 6/2002 | Jackson et al. ............... 358/1.13 |
| 2002/0156765 A1 | 10/2002 | Malone et al. |

(Continued)

FOREIGN PATENT DOCUMENTS

EP 1 253 524 A1 10/2002

OTHER PUBLICATIONS

Evelina Thunell, "The CIP4 JDF Editor—Visualization of JDF," [Online], Jun. 2003, Paaes 1-43, XP-002361788.*

(Continued)

*Primary Examiner* — Lynda Jasmin
*Assistant Examiner* — Timothy Padot
(74) *Attorney, Agent, or Firm* — Fay Sharpe LLP

(57) ABSTRACT

A system and method of modeling and evaluating workflows that provides workflow auto generation and Hierarchical Dependence Graphs for workflows. Modeling and evaluation of workflows is accomplished by accessing a knowledge database containing service descriptions, generating valid workflows models, simulating workflow and obtaining customer requirements through a Graphical User Interface. This system and method generate and display workflows that satisfy a users requirements. In addition, Hierarchical Dependence Graphs provide abstract views that provide additional analysis and control of workflow.

3 Claims, 17 Drawing Sheets

U.S. PATENT DOCUMENTS

| | | |
|---|---|---|
| 2003/0023472 A1 | 1/2003 | Lee et al. |
| 2003/0033182 A1 | 2/2003 | Stok et al. |
| 2003/0084016 A1* | 5/2003 | Norgaard et al. ............... 706/60 |
| 2004/0133457 A1 | 7/2004 | Sadiq et al. |
| 2005/0050466 A1* | 3/2005 | Sangroniz et al. ............ 715/526 |
| 2005/0068547 A1* | 3/2005 | Negishi et al. ................. 358/1.1 |

OTHER PUBLICATIONS

Evelina Thunell, "The CIP4 JDF Editor—Visualization of JDF," [Online], Jun. 2003, pp. 1-43, XP-002361788.*

Xerox: New Xerox system makes customized printing fast and easy, lets print providers offer 'do-it-yourself' variable documents. M2 Presswire. Coventry: Apr. 25, 2003. p. 1.*

Soon Ae Chun, Yugyung Lee, James Geller, "Ontological and Pragmatic Knowledge Management for Web Service Composition," Database Systems for Advanced Applications, 9th Internatnional Conference, DASFAA 2004, Lecture Notes in Computer Science 2973, pp. 365-373, 2004 XP-002338819, Berlin Germany.

Chris Tuijn, "Workflow Modeling in the Graphic Arts and Printing Industry," Color Imaging IX: Processing, Hardcopy, and Applications. Jan. 20-22, 2004, San Jose, California, USA [Online], vol. 5293, No. 1, Dec. 18, 2003, pp. 66-74, Proceedings of the SPIE—The International Society for Optical Engineering SPIE-Intl. Soc. Opt. Eng., USA, XP-002361789.

Soon Ae Chun, Vijayalakshmi Alturi, Nabil R. Adam, "Domain Knowledge-Based Automatic Workflow Generation," Database and Expert Systems Applications, 13th International Conference, DEXA 2002, Proceedings, Lecture Notes in Computer Science, 2453, pp. 81-93, 2002 XP002338820 Berlin, Germany.

"Job Definition Format (JDF)," [Online], Mar. 14, 2000, pp. 1-8, XP-002262816 by Adobe, AGFA, Heidelberg and Man Roland.

Konstantin Knorr, "Dynamic Access Control Through Petri Net Workflows," 1063-9527/00 2000IEEE, Department of Information Technology, University of Zurich, knorr@ifi.unizh.ch, pp. 159-167.

James L. Peterson, "Petri Nets," Computing Surveys, vol. 9, No. 3, Sep. 1977, pp. 223-252, Department of Computer Sciences, The University of Texas, Austin, TX 78712.

Yoshiaki Itoh, Iko Myazawa, Jing Hong Liu, Takashi Sekiguchi, "On Analysis of Petri Net Properties Based on Transitive Matrix," IECON '99, Conference Proceedings, 25th Annual Conference of the IEEE Industrial Electronics Society, Nov. 29-Dec. 3, 1999, San Jose, CA, [Online], vol. 2, 1999, pp. 973-978, vol. 2, IPECON '99, Conference Proceedings, 25th Annual Conference of the IEEE Industrial Electronics Society (Cat. No. 99CH37029) IEEE Piscataway, NJ, XP-002361790.

W.M. P. Van Der Aaist, "Workflow Verification: Finding Control-Flow Errors Using Petri-Net-Based Techniques," Business Process Management, LNCS vol. 1806, 2000, pp. 161-183.

European Search Report, Application No. EP 05 25 2261, Jan. 16, 2006, 8 pages.

* cited by examiner

EDGES AMONG TOP LEVEL WORKFLOW NODES:
$e_0 = (\alpha, PG1, R0)$; $e_1 = (PG1, PG2, R1)$;
$e_2 = (PG1, PG2, R2)$; $e_3 = (PG1, PG2, R3)$;
$e_4 = (PG2, \beta, R4)$ ALL EDGES AT PROCESS EXECUTION LEVEL:
$e'_0 = (\alpha, P1, R0)$; $e'_1 = (\alpha, P2, R0)$; $e'_2 = (P1, P3, R1')$;
$e'_3 = (P2, P3, R2')$; $e'_4 = (P1, P4, R1)$; $e'_5 = (P3, P4, R3)$;
$e'_6 = (P2, P5, R2,)$; $e'_7 = (P4, P5, R4')$; $e'_8 = (P5, \beta, R4)$;

$$M = \begin{array}{c} \\ \alpha \\ P1 \\ P2 \\ P3 \\ P4 \\ P5 \\ \beta \end{array} \begin{array}{c} e'_0\ e'_1\ e'_2\ e'_3\ e'_4\ e'_5\ e'_6\ e'_7\ e'_8 \\ \left[\begin{array}{ccccccccc} +1 & +1 & 0 & 0 & 0 & 0 & 0 & 0 & 0 \\ -1 & 0 & +1 & 0 & +1 & 0 & 0 & 0 & 0 \\ 0 & -1 & 0 & +1 & 0 & 0 & +1 & 0 & 0 \\ 0 & 0 & -1 & -1 & 0 & +1 & 0 & 0 & 0 \\ 0 & 0 & 0 & 0 & -1 & -1 & 0 & +1 & 0 \\ 0 & 0 & 0 & 0 & 0 & 0 & -1 & -1 & +1 \\ 0 & 0 & 0 & 0 & 0 & 0 & 0 & 0 & -1 \end{array}\right] \end{array}$$

FIG. 18

$$C_{INTERIM} = \begin{array}{c} \\ \alpha \\ P1 \\ P2 \\ P3 \\ P4 \\ P5 \\ \beta \end{array} \begin{array}{c} R0\ \ R1'\ \ R2'\ \ R1\ \ R3\ \ R2\ \ R4'\ \ R4 \\ \left[\begin{array}{cccccccc} +2 & 0 & 0 & 0 & 0 & 0 & 0 & 0 \\ -1 & +1 & 0 & +1 & 0 & 0 & 0 & 0 \\ -1 & 0 & +1 & 0 & 0 & +1 & 0 & 0 \\ 0 & -1 & -1 & 0 & +1 & 0 & 0 & 0 \\ 0 & 0 & 0 & -1 & -1 & 0 & +1 & 0 \\ 0 & 0 & 0 & 0 & 0 & -1 & -1 & +1 \\ 0 & 0 & 0 & 0 & 0 & 0 & 0 & -1 \end{array}\right] \end{array}$$

REMOVE ROWS OF $\alpha$ AND $\beta$ $$C_{J\text{-}HDG} = \begin{array}{c} \\ P1 \\ P2 \\ P3 \\ P4 \\ P5 \end{array} \begin{array}{c} R0\ \ R1'\ \ R2'\ \ R1\ \ R3\ \ R2\ \ R4'\ \ R4 \\ \left[\begin{array}{cccccccc} -1 & +1 & 0 & +1 & 0 & 0 & 0 & 0 \\ -1 & 0 & +1 & 0 & 0 & +1 & 0 & 0 \\ 0 & -1 & -1 & 0 & +1 & 0 & 0 & 0 \\ 0 & 0 & 0 & -1 & -1 & 0 & +1 & 0 \\ 0 & 0 & 0 & 0 & 0 & -1 & -1 & +1 \end{array}\right] \end{array}$$

FIG. 19

$$C'_{J\text{-}HDG} = \begin{array}{c} \\ PG1 \\ PG2 \end{array} \begin{array}{c} R0 \quad R1 \quad R2 \quad R3 \quad R4 \\ \begin{bmatrix} -2 & +1 & +1 & +1 & 0 \\ 0 & -1 & -1 & -1 & +1 \end{bmatrix} \end{array} \overset{120}{\swarrow}$$

FIG. 20

$$C_{R\text{-}HDG} = \begin{array}{c} R0 \\ R1 \\ R_{21} \\ R_{22} \\ R3 \end{array} \begin{array}{c} P1 \quad P2 \quad d_1 \quad P3 \\ \begin{bmatrix} +1 & 0 & 0 & 0 \\ 0 & +1 & 0 & 0 \\ -1 & 0 & +1 & +1 \\ 0 & -1 & -1 & +1 \\ 0 & 0 & 0 & -2 \end{bmatrix} \end{array} \xrightarrow{\text{ROLL-UP PROCEDURE}} C'_{R\text{-}HDG} = \begin{array}{c} R0 \\ R1 \\ R2 \\ R3 \end{array} \begin{array}{c} P1 \quad P2 \quad P3 \\ \begin{bmatrix} +1 & 0 & 0 \\ 0 & +1 & 0 \\ -1 & -1 & +2 \\ 0 & 0 & -2 \end{bmatrix} \end{array}$$

FIG. 21

EDGES ARE:

$e_0 = (R0, R1, PG1); e_1 = (R0, R2, PG1);$
$e_2 = (R0, R3, PG1); e_3 = (R1, R4, PG2);$
$e_4 = (R2, R4, PG2); e_5 = (R3, R4, PG2);$

EDGES ARE:

$e'_0 = (R0, R2, P2); e'_1 = (R0, R1, P1); e'_2 = (R0, R1', P1);$
$e'_3 = (R0, R2', P2); e'_4 = (R2', R3, P3); e'_5 = (R1', R3, P3);$
$e'_6 = (R2, R4, P5); e'_7 = (R1, R4', P4); e'_8 = (R3, R4', P4);$
$e'_9 = (R4, R4, P5)$

EDGES ARE (WITH ONLY TOP LEVEL RESOURCES)
$e_0 = (\alpha, P1, R0); e_1 = (\alpha, P2, R1);$
$e_2 = (P1, P3, R2); e_3 = (P2, P3, R2);$
$e_4 = (P3, B, R3);$ EDGES ARE (WITH PARTITION RESOURCES)
$e_0 = (\alpha, P1, R0); e_1 = (\alpha, P2, R1);$
$e_2 = (P1, P3, R21); e_3 = (P2, P3, R22);$
$e_4 = (P3, B, R3);$

WORKFLOW AUTO GENERATION FROM USER CONSTRAINTS AND HIERARCHICAL DEPENDENCE GRAPHS FOR WORKFLOWS

This is a divisional application of U.S. patent application Ser. No. 10/836,298, filed Apr. 30, 2004, which is hereby incorporated herein by reference in its entirety.

BACKGROUND

This disclosure relates to Workflow Auto Generation and Workflow Analysis. It finds particular application in conjunction with workflow as related to printing jobs, and will be described with particular reference thereto. However, it is to be appreciated that the embodiments illustrated herein are also amenable to other like applications.

Workflow-based businesses rely heavily on their ability to effectively compete in and control existing and emerging workflows. Given the heterogeneity of the space, integration of these heterogeneous distributed systems is a considerable challenge and is fast becoming a critical factor of success in the business. In addition to the multiplicity of systems, customers are demanding customization and flexibility for their workflows. As a result, automation of the integration and deployment of workflows today means considerable competitive advantage. Effective modeling is key part of an overall workflow automation strategy.

Current workflow modeling technologies and tools enable clever visualization and some analysis capability. However, their effectiveness relies heavily upon the idiosyncratic knowledge and expertise of the person doing the modeling. That is, it is a highly manual and cumbersome effort and yields results only as good as the intuition and skill of the particular modeler.

Another aspect of this disclosure relates to Hierarchical Dependence Graphs for Dynamic JDF workflows. JDF is a Job Definition Format proposed by an industry consortium body CIP4, which affects every aspect involved in the creation and production of printing from pre-press, press to post-press. JDF provides a common language for describing a print job across enterprises, department, software and systems. It also provides a basis for workflow automation that incorporates human, machine and computer. But JDF itself is not an explicit workflow specification language. Instead, the JDF workflow is implicitly described as a job description that contains a collection of process nodes. The execution sequence of process nodes of a job description is implicitly defined as resource dependences across process nodes. JDF leaves the issues of how to drive the sequence of process flow unspecified and completely up to the implementation of MIS or Controller components in JDF-based system. However, in most existing implementations, either a JDF workflow is hard-coded within the implementation, or a limited set of static JDF workflows are supported. In order to facilitate a fully dynamic JDF workflow, the dependences among process nodes and resources should be expressed and tracked explicitly, and also should be decoupled completely from the implementations.

The Hierarchical Dependence Graph (HDG) of this disclosure extends the theory of directed acyclic graph (DAG) by allowing hierarchical representation of workflows. It can be used to explicitly express the dependences across JDF (process) nodes and resources derived from any JDF job description. It defines a flexible and semantic-rich model to represent JDF workflow as a set of DAGs at different abstractions: intent level, process group levels and process execution level.

By explicitly representing JDF workflows in the HDG, it not only enables the separation of the workflow itself from MIS/ or Controller implementations to support fully dynamic JDF workflows, but also it provides a theoretic basis for formal analysis of JDF workflows.

Furthermore, this disclosure introduces the concept of Connectivity Matrixs and their transformations to allow two views derived from a single model: process-centric view and resource-centric view. By exploiting the fact that each of these views is a DAG with a hierarchical structure, it is possible to show various analytical properties defined for DAG and recursively analyze JDF workflows, particularly in the following perspectives:

Validating the JDF workflow is a valid workflow without any cyclic dependence, missing resources, dangling resources or nodes.

Identifying the impacted JDF nodes or resources due to the availability and workflow status changes Intelligently handling failures or exceptions by considering the root causes of failures or exceptions rather than the static dependence pre-defined in a given workflow model.

The key innovations are primarily two-fold: (1) extending DAG (directed acyclic graph) with a hierarchical structure which results in a novel graph structure HDG (hierarchical dependence graph); and (2) using multiple orthogonal HDGs to explicitly describe the dependencies between workflow components, which eventually enables dynamic workflows, such as JDF.

BRIEF DESCRIPTION

In accordance with one embodiment of the disclosure, a workflow auto generation system is disclosed. The workflow auto generation system comprising a knowledge database containing service descriptions; a workflow modeling inference engine that generates valid workflow models by matching connectivity between various services in the knowledge base; a simulator performing a simulation of each workflow; and a Graphical User Interface to obtain customer requirements and display views of the workflows.

In accordance with another embodiment of the disclosure, a method of auto generating workflow is disclosed. The method of auto-generating workflow comprising accessing a knowledge database containing service descriptions; generating a workflow model using a workflow modeling simulation engine to match connectivity between various services in the knowledge base; simulating each workflow; obtaining customer requirements through a Graphical User Interface; and displaying views of the workflow through said Graphical User Interface.

In accordance with another embodiment of the disclosure, a workflow auto generation system is disclosed. The workflow auto generating system comprising means for accessing a knowledge database containing service descriptions; means for generating a workflow model using a workflow modeling simulation engine to match connectivity between various services in the knowledge base; means for simulating each workflow; means for obtaining customer requirements through a Graphical User Interface; and means for displaying views of the workflow through the graphical user interface.

In accordance with another embodiment of the disclosure, a workflow analysis and control system is disclosed. The workflow analysis and control system comprising a workflow client service, providing a description of various print jobs to be executed; a workflow analysis service, performing a Hierarchical Dependence Graph representation and analysis of a workflow, including process and resource dependences; and a workflow orchestrator, controlling the execution of said print jobs, wherein the workflow client service provides input to the workflow analysis service and the workflow analysis service provides input to the workflow orchestrator.

BRIEF DESCRIPTION OF THE DRAWINGS

FIG. 18 is an Incidence Matrix

FIG. 19 is a Connectivity Matrix.

FIG. 20 is a Connectivity Matrix transformed.

FIG. 21 illustrates the Connectivity Matrices of R-HDG.

DETAILED DESCRIPTION

Figure 1:
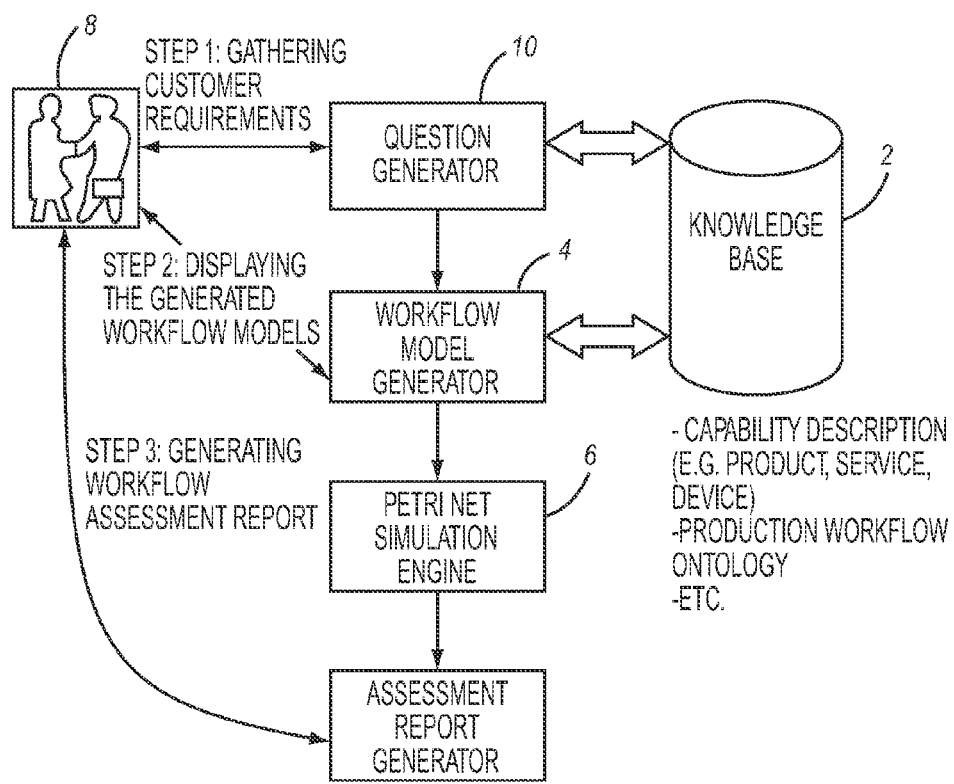
FIG. 1 is a block diagram of an embodiment of workflow auto generation.

The present disclosure provides a formal way of modeling and evaluating workflows, which obviates the current intuitive, trial-and-error approach. It is a technique for dynamically auto-generating all valid workflow models from a given set of functional requirements and determining optimal workflows based upon varying sets of user-specified parameters. It replaces a cumbersome manual effort of trial and error. Workflow service descriptions containing functional attributes, which describe control and data interfaces, and non-functional attributes which describe service features and performance metrics, are stored in a logical database. Logically valid workflows are then generated by using a formal mechanism called Petri Nets. The valid workflows are evaluated against user-defined metrics to determine optimal workflows. The user-defined metrics are obtained by a questions-generation mechanism. Possible workflows are visualized in various views using auto-graph layout techniques to bridge the gap between user functional requirements and vendor product offerings.

In order to dynamically generate workflows, the detailed service or process descriptions specifying their capability, recognition and interfaces are stored in the logical database. This information is used to create valid connectivity between various services. These descriptions are obtained from XML-based service interface descriptions such as the Job Definition Format (JDF). They contain information such as service control and data interactions and device associations. The control interaction describes the communication mechanism used by a service for control. The data interaction describes the communication mechanism essential for data exchange, such as the type of data structures, data types and data sizes. The control, data and other parameters that specify functionality can be categorized as functional attributes. Parameters specifying the device metrics, such as cost, QOS, availability and throughput can be categorized as non-functional attributes. The valid workflows generated contain all the services, which meet both the user's functional and non-functional requirements.

Petri Nets are used in this disclosure to represents distributed asynchronous systems operating concurrently. When a workflow is mapped to a Petri Net[s], certain properties dealing with the correctness of workflows, such as deadlocks, liveliness, and bounded-ness, can be verified using graph analysis. The performance of workflows can also be simulated by colored and timed Petri Nets. Colored Petri Nets enable consideration of various job types and resource availability. Timed Petri Nets can be used to model workflows in which various services are dependent on time. In addition, hierarchical Petri Nets can also be used for modular and top-down representations of systems.

The primary requirement of a dynamically generated workflow model is correctness. Though functional programming languages are good at structuring programs and making them run efficiently, they are not so good at checking for a logical or syntactical correctness. Logic programming, due to its built-in support for non-determinism and unification, can be used to explicitly and thoroughly check the correctness of generated workflow models. Since the results are generated dynamically, inclusion of new components does not impact the original program.

Generated workflows are in the form of a formal edge vertex notation, and they require some graph auto-layout techniques to visualize the workflows. The generated workflows must have no edge crossings and must be symmetrical and evenly spread across a given area.

With reference to FIG. 1, a workflow modeling pre sales tool is used to auto-generate valid workflow models based on customer requirements and available services. The tool has four basic components: (1) A knowledge base 2 containing the service descriptions, (2) a workflow modeling inference engine 4 that generates all the valid workflow models by matching connectivity between various services in the knowledge base, and meeting user constraints, (3) a Petri Net simulator 6 that performs a simulation of each workflow by mapping it to a Petri Net, and (4) a GUI 8 to (a) obtain customer requirements through a series of questions 10 which narrow down the workflow options meeting those requirements, and (b) visualize service, product and Petri Net views of workflows.

Figure 2:
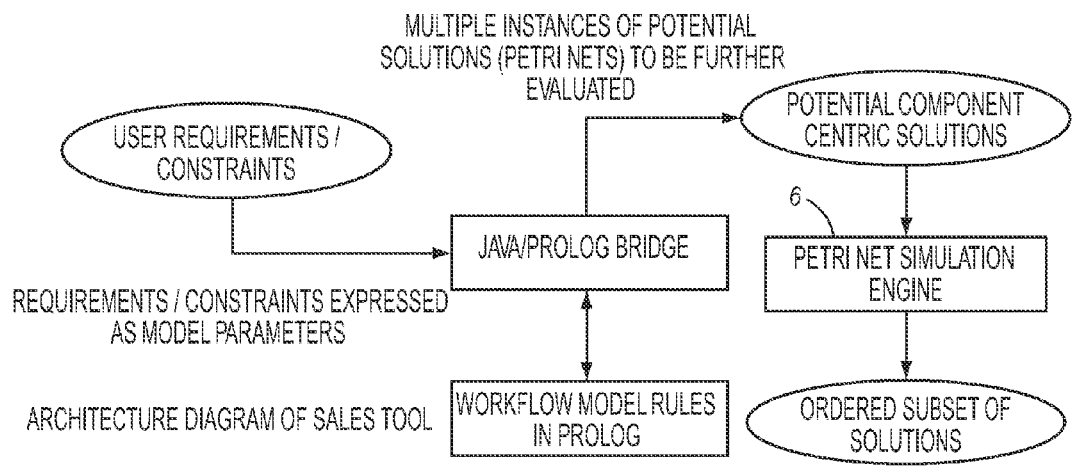
FIG. 2 is a block diagram of another embodiment of workflow auto generation.

FIG. 2 illustrates the architectural diagram of an embodiment of the sales tool described with reference to FIG. 1.

Service Descriptions in the Knowledge Base.

The knowledge base 2 contains descriptions of the available services, with detailed descriptions of the service parameters. The service parameters are obtained from XML-based JDF and other capability description formats. The service structure is shown below.

Service (refID, devId, Service_Details
,[Constraints(InboundConstraints)]
,[Constraints(OutputConstraints)]
,[Attributes(Attributes)]
,[Constraints(DataInputConstraints)]
,[Constraints(DataOutputConstraints)])
Product (prodID, prod_Details).

The refID is a unique ID representing a service. The list of input and output constraints consists of the control inputs and outputs that a service accepts or could connect to. For example, (control_port,tcp_ip,2) for InboundConstraints implies that a service accepts two TCP\IP connections at a time. The number 2 is the cardinality specifying the number of services that the service can handle. Similarly, (data_format,pdf,1) for DataInputConstraints implies that a service can accept one pdf document at a time. The attributes contain a list of service-centric parameters, such as service delay, or may include additional service-specific constraints. Service_Details contains additional service-specific information such as name, version etc. The prodID refers to the product the service maps to. The product contains a unique prodID and device-centric parameters such as the manufacturer, version, cost, etc. The service has an n-to-n relationship with products.

Figure 3A:
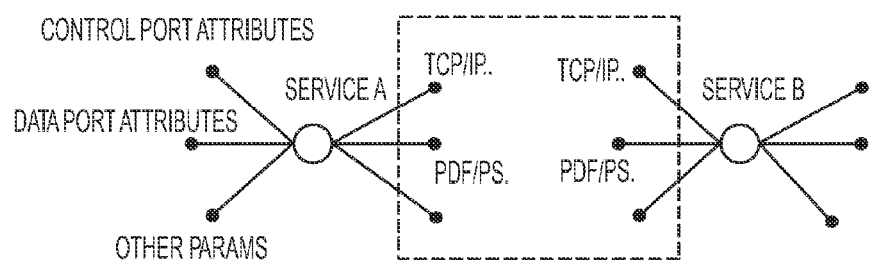
FIG. 3A is a block diagram of a Workflow Modeling Inference Engine.

With reference to FIG. 3A, the inference engine generates all the possible workflows by checking valid connections between various services. There is a valid connection between two services if all the control and data output parameters of one service match the input parameters of the other service. The workflow options are narrowed down as the user selects more specific options.

Figure 3B:
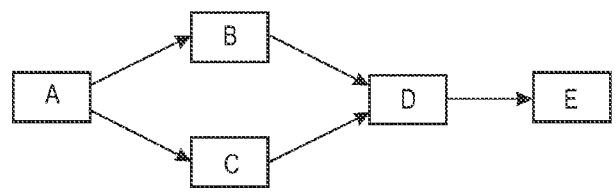
FIG. 3B is a representation of a valid work flow.

The inference engine initially generates a permutation of valid paths by matching valid service and user requirements, and then generates all the combinations of all the valid paths which would generate possible workflow structures. With reference to FIG. 3B, an example of a valid workflow generated with the inference engine follows:
WF=A ([ ], [B, C]), B ([A], [D]), C ([A], [D]), D ([B, C], [E]), E([D][ ])

The above structure specifies that there are five services, namely A, B, C, D, E. The initial list in each tuple specifies the input services and the second one specifies the list of output services. This can be visually depicted as illustrated in FIG. 3B.

Here A has an output cardinality of 2, indicating that A can connect to two services-B and C.

The above representation could be extended to have tuples for each service represent branching conditions and iteration. For example, for service D, D(j,b,i) could represent the joining condition, branching condition and the number of iterations. Using the previous representation D(OR,AND,0) would mean that D has an OR join, an AND branch and no loops allowed.

The above workflow structure illustrated in FIG. 3B, can be transformed into a Petri Net representation for analysis and simulation. Petri Nets enable the modeling of various branching conditions such as AND, OR, XOR splits and joins. The tool currently supports simple split and join workflows and does not support analysis for branching conditions. Some features of the timed Petri Nets have been used to perform simulation.

Figure 4:
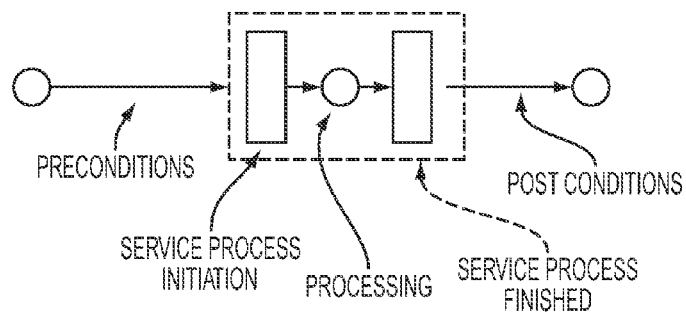
FIG. 4 is representation of a generic service structure.

As represented in FIG. 4, a service has a generic structure consisting of two transitions and a place. Places hold tokens, and transitions are the active components which fire when there are sufficient tokens available in the proceeding places. A service is represented with two transitions and a place in between. The first transition fires when all the preconditions are met, and the second transition fires when the processing is complete. This allows us to have a state denoting that the service is still processing the job, which is when the token is in the center place.

Token/Job representation in prolog:
Token (job_id, time_spent, (pending_transition,delay_time)).
  job_id—job number
  time_spent—the time the job spent in the workflow since it was ready and in the queue.
  pending_transition—the transition where the token is waiting
  delay_time—the delay or waiting time at the transition Marking gives the state of the current Petri Net; it is a vector of all the places in the Petri Net.

Example of an initial marking indicating the state of the Petri Net with four places and two jobs:
marking([p1[(job1,0,(0,0)),(job2,0,(0,0))]),
(p2[ ]),(p3[ ]),(p4[ ])]).

Here transitions are associated with a certain delay, and there is a global clock through which the delays of active various transitions get updated and know when to fire. The transition fires when the tokens are available, and the tokens wait for a certain time in their previous place (which is equal to the delay of the transition). When there is a branch with more than one transition and one token becomes available, the transition which gets ready to fire, after elapsing a certain time, fires first. When the delay of two transitions is equal, then both transitions fire simultaneously.

The sum of delay of the two transitions is equal to the service delay. Each job contains the global time, time spent in the net and time spent at each transition to fire. Based on the number of jobs in the initial place and the total and average times taken by the Petri Net-based workflow, the total throughput is obtained. The cost function is a summation of the cost of each product. The cost could be extended to be a function of the resource utilization.

In order to perform real-time workflow simulation, there might be various types of resources needed in order to process a single job, resources that have to be shared, and also various types of jobs that have to be processed. The timed Petri Nets could be extended to implement resource sharing. The colored Petri Nets allow modeling of systems when there are different types of jobs and different types of tokens. The process could also contain a queue of jobs.

Many available Petri Net tools could also do Petri Net simulation by generating a Petri Net Markup Language (PNML), which is a Work Flow Management Coalition Standard adopted by many analysis and simulation engines.

In order to gather the workflow functionality requirements from the user, required attributes of services are selected directly on the GUI, or the user can respond to questions generated by an automated question-generation module. The questions eventually narrow down the set of workflows.

Figure 5:
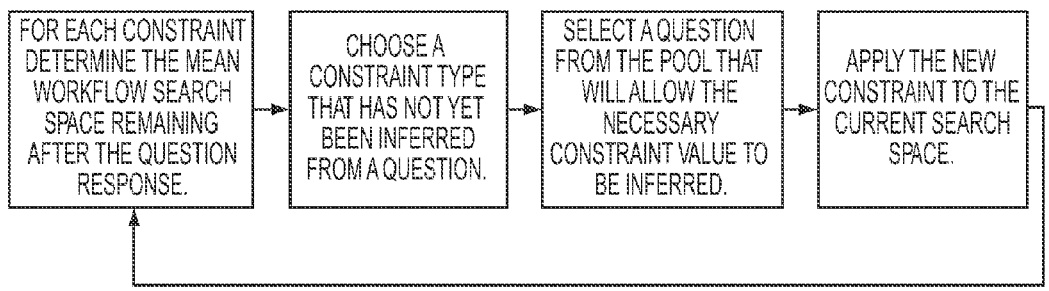
FIG. 5 is a block diagram of an Automatic Question Generator for gathering customer requirements.

The automated question-generation module, represented in FIG. 5, was developed for a person with less technical knowledge. The user might not be aware of the various interfaces that are necessary to meet his or her requirements. The questions are developed to be easily understood and mapped to the service constraints in the knowledge base. This question-generation module also minimizes the user trial-and-error effort in searching for valid workflows and also manages to reduce the workflows to a minimum feasible set to choose from. The service constraints are grouped into categories, such as service type and output constraints. An optimal question is generated based on the probability of the combination of attributes which generates a minimum number of workflows, and those attributes that have not yet been chosen. This is not a very efficient technique, however, as it performs an exhaustive search on all the available constraints. It would be more appropriate to have heuristics to choose an appropriate question.

The user can also directly select the service constraints in the user interface. Service constraints are grouped based on their constraint type. All valid workflows containing the required specifications are obtained.

Figure 9:
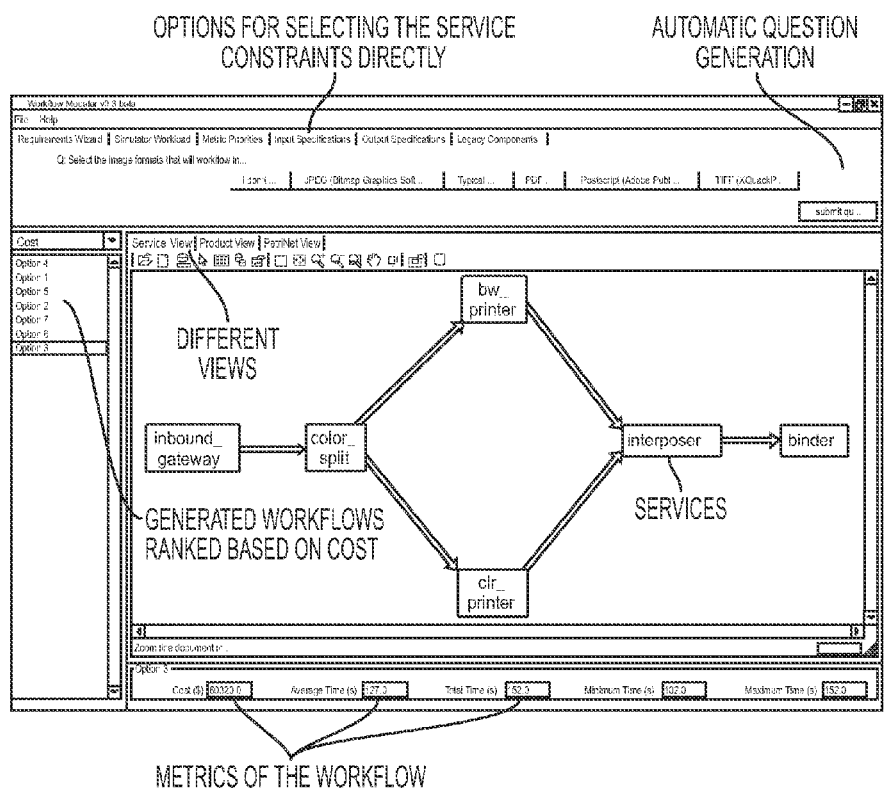
FIG. 9 is a service view of workflow auto generation.
Figure 10:
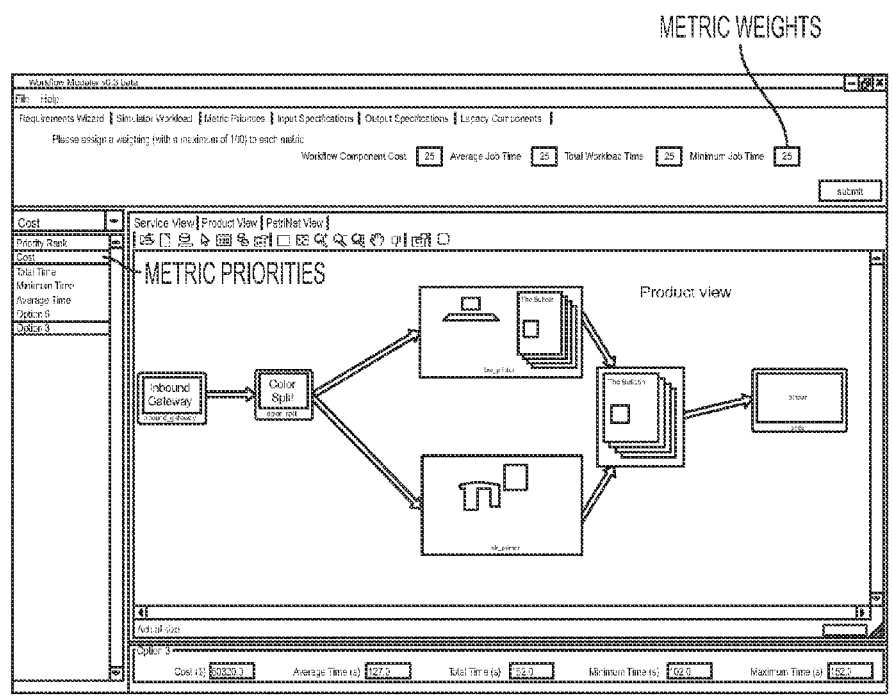
FIG. 10 is a product view of workflow auto generation.
Figure 11:
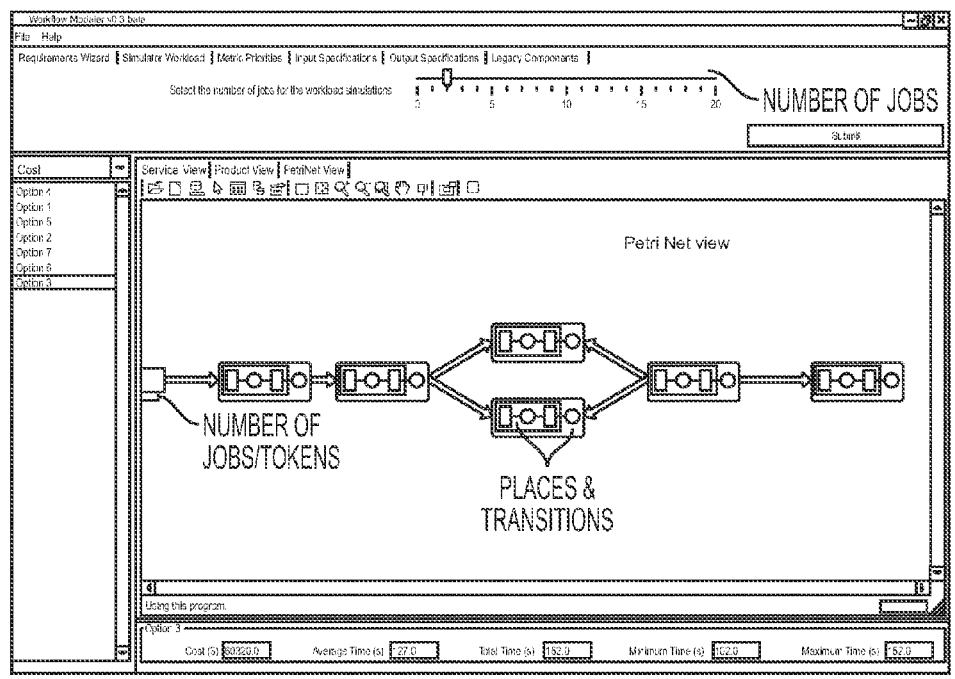
FIG. 11 is a Petri Net view of workflow auto generation

As illustrated in FIG. 9, FIG. 10 and FIG. 11, three different workflow views are generated-namely, a service workflow view, a device workflow view, and a Petri Net-based workflow view, respectively. When a user selects a workflow and a view in the GUI, an XML file is generated which consists of the nodes' location co-ordinates and arcs between the nodes. The workflows considered here are planar and acyclic graphs. The co-ordinates could be generated by calculating the displacement whenever there is a branch.

The workflow structure obtained from the workflow modeler in Prolog could be converted to a nested list structure to indicate branching and joining.

Any two-dimensional acyclic and planar workflow can be represented as a nesting of lists. A list is an ordered sequence of elements of any length separated by commas altogether enclosed in square brackets. The elements can be a single service or another list of services. A service can connect to a number of services if their functional attributes and cardinality (number of services it can connect to) match.

Figure 6A:
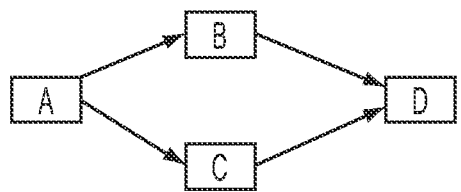
FIGS. 6A, B and C are list representations of workflow.
Figure 6B:
Figure 6C:
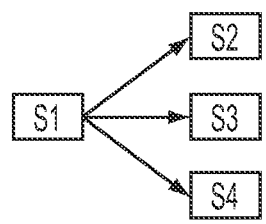
Figure 7:
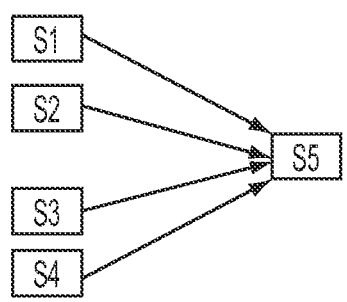
FIG. 7 is a list representation of workflow.

For example, the workflow illustrated in FIG. 6A could be represented as [[A], [B], [C]], [D]]. The assumption is that every element in the list represents a workflow and every service is assumed to be a single workflow. If L1, L2 contain one element (service/atom), then L1, L2 are in sequence. That is, L1=[s1], L2=[s2] then [L1,L2]=[[s1][s2]] as illustrated in FIG. 6B. If L1 contains one element and L2 contains X elements, then L1 has to connect to X elements. That is, if L=[s1], L2=[[s2], [s3], [s4]], x=3. [L1, L2]=[[S1], [[S2], [S3], [S4]] as illustrated in FIG. 6C. If L1 contains x elements and L2 contains one element, then x elements have to connect to L2. That is, here L1=[s1][s2][s3][s4] and L2=[s5], as illustrated in FIG. 7. This approach allows easier visualization, easy-to-analyze subnets and hierarchical abstraction at each level as discussed below. The x and y co-ordinates can be generated by parsing the above structure which generates a graph, this representation is unambiguous for planar and acyclic graphs. An auto-layout graph algorithm can visualize the workflow. The SDMViewer supplied by ILOG, a commercial graph layout software package, generates a graph based on the XML file and the view format described in a style sheet.

Figure 8:
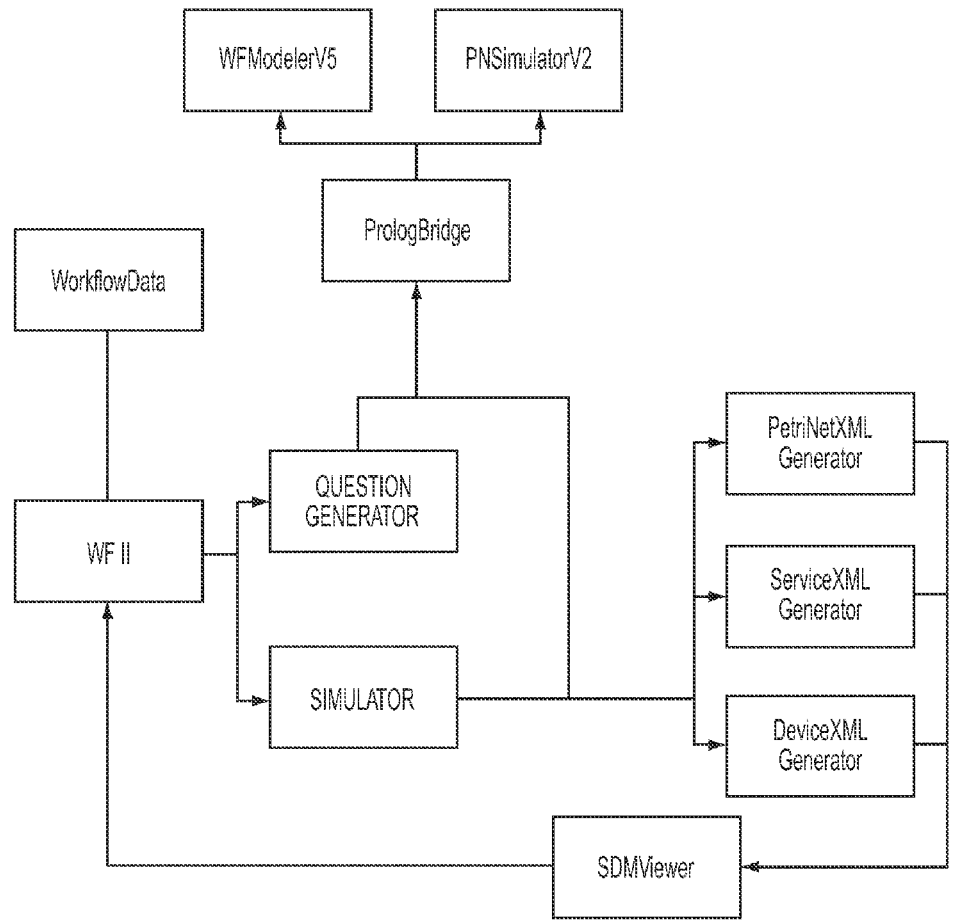
FIG. 8 is a block diagram of an embodiment of workflow auto generation.
Figure 12:
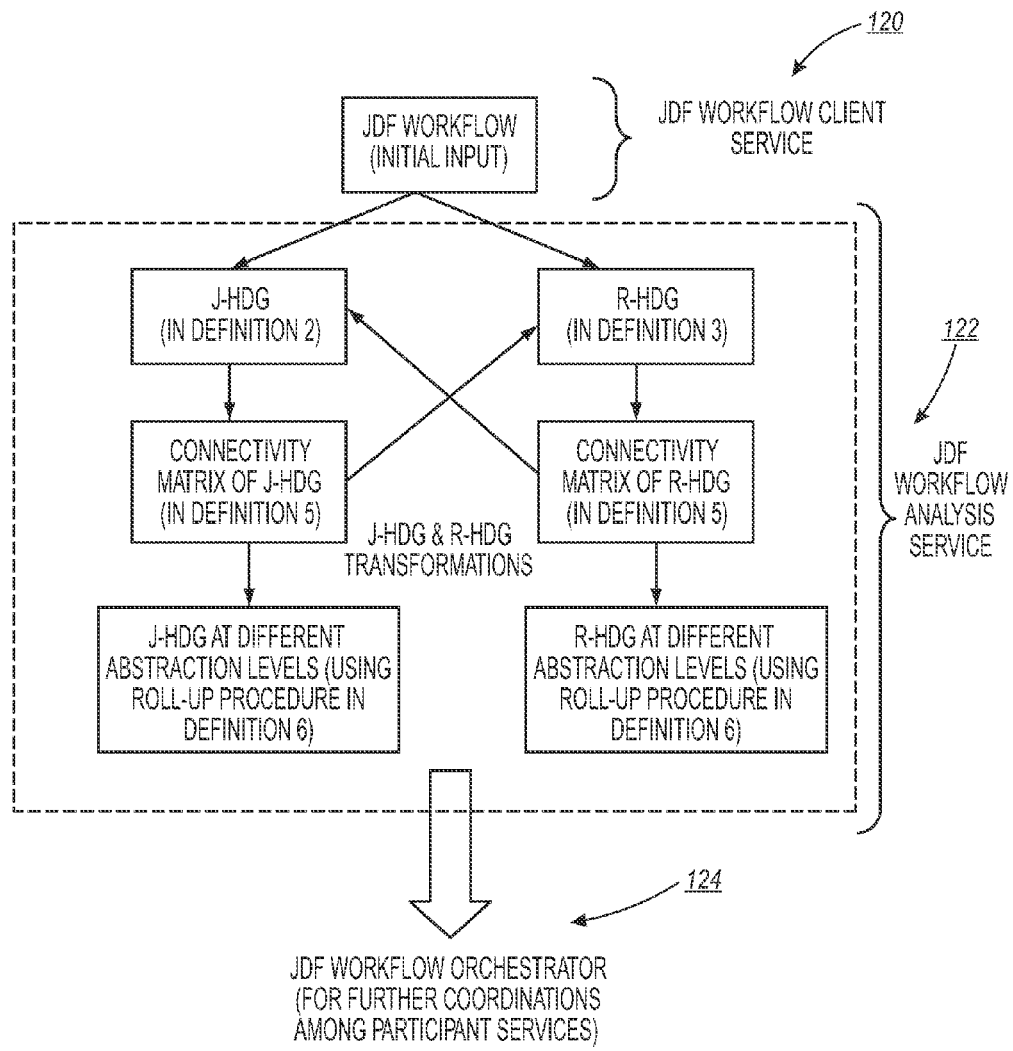
FIG. 12 is a block diagram of HDG for Workflow, including Input and Output.

FIG. 8 illustrates a high level diagram of the system described above. FIG. 9, FIG. 10 and FIG. 12 illustrate one embodiment of screen views that provide service, product and Petri net configurations, respectively. These configurations are viewable by the user/customer and provide a workflow modeling Sales Tool.

Figure 13:
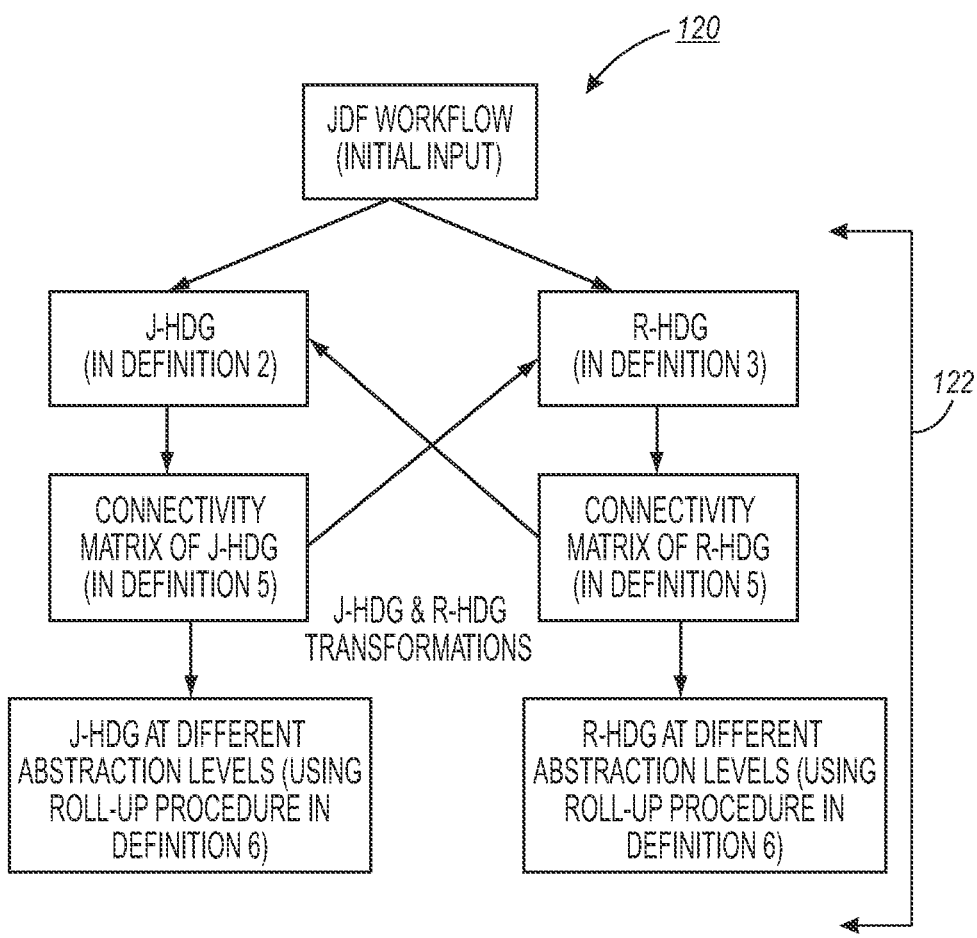
FIG. 13 is a block diagram of HDG for Workflow.

With reference to FIG. 12 and FIG. 13, with another aspect of the present exemplary embodiment, this disclosure provides an extended DAG structure: Hierarchical Dependence Graph (HDG), which represents a workflow 120, for example JDF, through exploring the process and resource dependences. HDGs provide not only an explicit workflow semantics but also a formal foundation for workflow analysis 122. By using HDG's connectivity matrix and its transformations, the dual forms of HDG can be constructed (i.e. J-HDG and R-HDG) which provide orthogonal views of interactions and dependencies between workflow components 124. HDG-based workflow analysis also provides an analysis technique for failure/exception handling.

JDF workflow is specified through a hierarchical job tree structure, which describes all the production processes and material types likely to encounter in XML. It contains two basic elements: JDF nodes and resources, which are strung together through the resource input/output linking to meet the requirements of each workflow job. Depending on various needs, JDF node can be any of the following types: Product node (intent-level), Process Group node, and Process node (execution-level). Typically, MIS/or Controller needs to map any Product node into Process node(s) which then could be ultimately routed to a destination for execution. A process is an operation performed on digital data, such as a PDF file or an imposition design, or on a physical item, such as a lift of paper. A resource is the digital data or physical item itself. The output of one process becomes the input of the following process(es), and a process doesn't begin until its input resources are available. JDF defines details on how to use these building blocks to describe concurrent processes, spawned processes, merged processes and dynamic processes.

Figure 14:
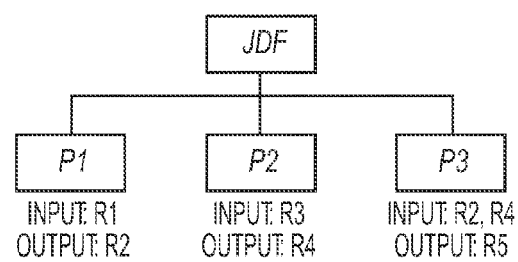
FIG. 14 is an example of a JDF Job Tree.
Figure 15:
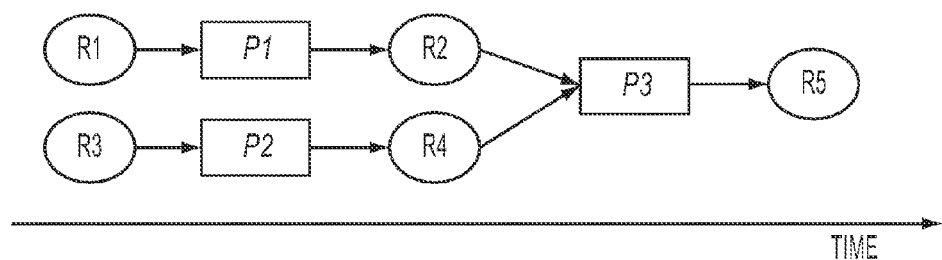
FIG. 15 is an example of a Process Sequence Chain.

FIG. 14 and FIG. 15 are simple illustrations of a JDF job tree structure and its corresponding process sequence linked by resources, within which the JDF root node jdf contains three process nodes P1, P2, and P3. Process P1 has input resource R1, output resource R2; Process P2 has input resource R3 and output resource R4; Process P3 has input resource R2 and R4, output resource R5.

Directed acyclic graph is a directed graph where no path starts and ends at the same vertex [1]. It is very useful graphical structure in representing syntactic structure of arithmetic expressions, representing task graphs and precedence relations in many scheduling applications. The Hierarchical Dependence Graph (HDG) extends the directed acyclic graph (i.e. DAG) with hierarchical structures. One aspect of this disclosure can use two types of HDG, one is job-centric (or process centric) HDG or J-HDG in short, another one is resource-centric or R-HDG in short. The formal definitions of these graphical structures are as follows:

Definition 1:

HDG is a graph G=<V, E> with no cycles, where V={v|$v_i \epsilon$V, I=1, . . . |V|} is a set of vertices and E={e|$e_k \epsilon$E, k=1, . . . |E|} is a set of directed edges, within which $e_k$ is an ordered pair of vertices with a label. Namely, $e_k=(v_i, v_j, \lambda_k)$ where $v_i$, $v_j \epsilon$V are in-vertex and out-vertex of edge $e_k$ respectively; and $\lambda_k$ is a symbolic label of $e_k$. For certain vertices in HDG V' $\subset$ V, they may contain DAGs within themselves.

In J-HDG, JDF nodes are vertices, their incoming edges are labeled with input resources and outgoing edges are output resources. Depending on which JDF node type it belongs to, each vertex in J-HDG can be either an atomic element (i.e. JDF Process node) or be further decomposed on to a DAG itself (i.e. JDF Product node or Process Group node). J-HDG not only retains the flexible JDF hierarchical structure, but also explicitly represents the control sequence among JDF nodes. By incorporating J-HDG structure in MIS/or Controller design, it can avoid any hard-coded workflow control sequence in their implementation so that fully dynamic workflows can be supported. With an explicit job-centric dependence representation, J-HDG is also an intermediate step between JDF job structure and emerging explicit workflow description standards (i.e. BPEL, BPML). By properly mapping JDF to/from BPEUBPML, it ultimately enables the workflow engine to seamlessly orchestrate JDF workflow through a standard workflow description.

Definition 2:

J-HDG is a HDG G=<V, E>, where V={v|$v_i \epsilon$V, 1=1, . . . , |V|} is a set of vertex and E={e|$e_k \epsilon$E, k=1, . . . |E|} is a set of directed edges. N represents a set of JDF nodes and R represents a set of JDF resources (which can be directly linked with JDF nodes, including their partitioned resources). Respectively, the source and target vertices that are external to any given JDF job description are generally denoted as $\alpha$ and $\beta$. Therefore, $V = N Y \{\alpha, \beta\}$ for any $e_k \in E$, $e_k = (v_i v_j, \lambda_k)$ where $v_i$, $v_j \in V$ are in-vertex and out-vertex of edge $e_k$ respectively, and $\lambda_k \in R$.

In R-HDG, however, JDF resources are vertices, their incoming edges are JDF nodes that produced them and outgoing edges are JDF nodes that consumed them. Since all JDF resources are partitionable, for each JDF resource with partitioned resource parts, the precedence relations among partitioned parts can be described in a DAG. Hence, each resource vertex in R-HDG potentially contains a DAG itself.

Definition 3:

R-HDG is a HDG $G = <V, E>$, where $V = \{v | v_i \in V, 1 = 1, \ldots, |V|\}$ is a set of vertex and $E = \{e | e_k \in E, k = 1, \ldots |E|\}$ is a set of directed edges. N represents a set of JDF nodes and R represents a set of JDF resources (which can be directly linked with JDF nodes) and $\delta$ represents a set of resource precedence relations between partitioned resources. Therefore, $V = R$ for any $e_k \in E$, $e_k = (v_i \; v_j, \lambda_k)$ where $v_i$, $v_j \in V$ are in-vertex and out-vertex of edge $e_k$ respectively, and $\lambda_k \in N Y \delta$.

Figure 16A:
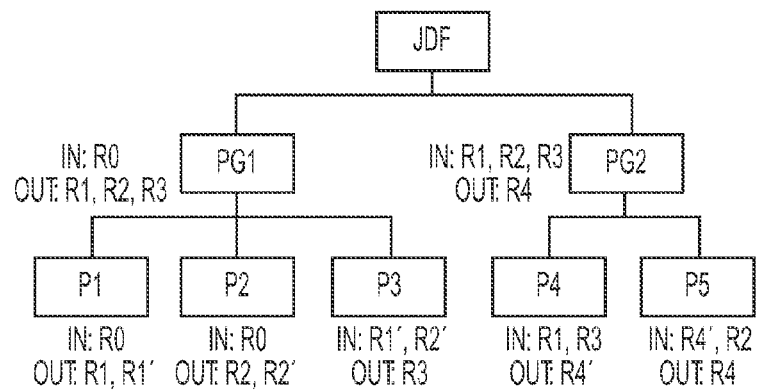
FIGS. 16A, B, and C are an example of a JDF Workflow and associated J-HDG Representations.
Figure 16B:
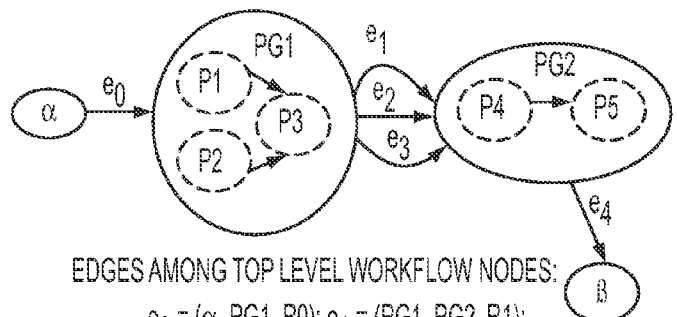
Figure 16C:
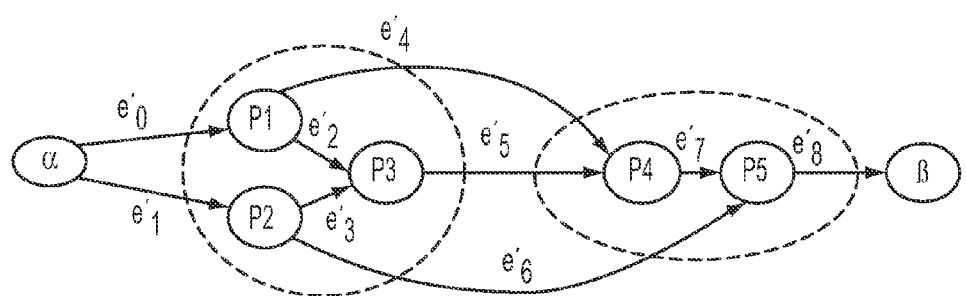

FIGS. 16A, B and C show a simple example of a JDF Job tree (workflow instance), FIG. 16A, and its derived J-HDG representations, FIG. 16B (one at top level, one at bottom process execution level). The JDF nodes at process execution level, FIG. 16C, are atomic work units which can be scheduled/orchestrated within a given workflow.

Figure 17A:
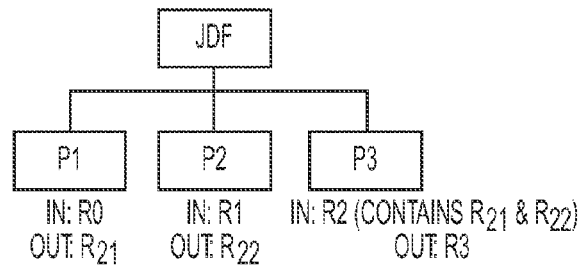
FIGS. 17A, B and C are an example of a JDF Workflow; Hierarchical Resource Structure; and J-HDG and R-HDG representations.
Figure 17B:
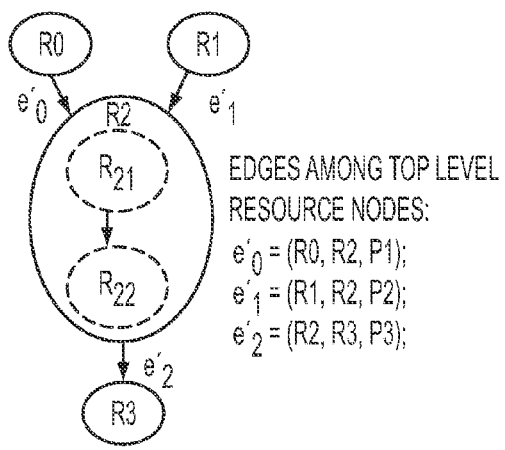
Figure 17C:
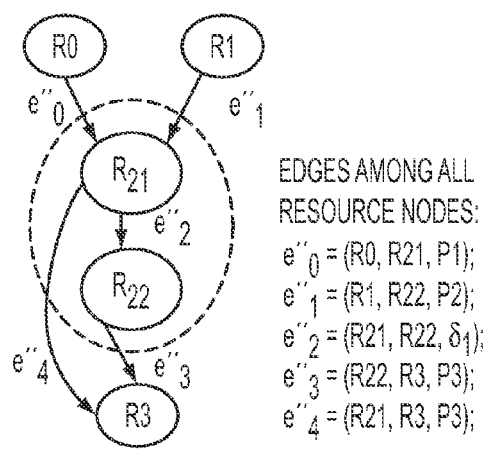

FIGS. 17A, B and C show example of a JDF workflow, FIG. 17A, which contains partitioned resources and the derived R-HDG representations at two levels (top level resource, FIG. 17B, and portioned resource level, FIG. 17C). The top level resource is identified with a unique resourceID, and the nesting partitioned resource is identified as a sequence of resourceID/partID(key)s and so on. The resource R2 has two partitioned resources $R_{21}$ and $R_{22}$; $R_{21}$ is a precedent of $R_{22}$. R-HDG can be filtered according to the resource types. For example, if document type JDF resources (i.e. RunList, FileSpec, etc.) are specified, a much simpler and concise R-HDG sub-graph can be formed to provide a document-centric view of workflow.

As a linear graph, the structure of HDG can be represented by an incidence matrix and its operations (e.g. addition, multiplication, transposing, etc.). This section provides a definition of a HDG Incidence Matrix to further define a HDG Connectivity Matrix. From the Connectivity Matrix, transformations of J-HDG and R-HDG are produced.

Definition 4:[1]

The Incidence Matrix of HDG G of V vertices and E edges is a matrix $M = [m_{ij}]$ of order [V] and |E| where: mij=1 if edge j is incident at vertex i and is oriented away from vertex i; mij=−1 if edge j is incident at vertex i and is oriented toward vertex i; mij=0 otherwise.

For example, as illustrated in FIG. 18, the incidence matrix of a J-HDG at process execution level for the example given in FIGS. 16A, B and C. Note that in FIG. 18, each column of matrix M has exactly two non-zeros (one is +1 and the other is −1). The +1 denotes a column and is an outgoing edge, while −1 denotes a column is an incoming edge.

Definition 5:

The Connectivity Matrix of a HDG represents the connectivity between JDF nodes and resources of a given J-HDG or R-HDG, where N of JDF nodes and R of JDF resources. The Connectivity Matrix of J-HDG is a matrix $C_{J\text{-}HDG} = [c_{ij}]$ of order |N| and |R|, where each column $c_j$ is the addition of any columns of the incidence matrix of J-HDG with a same resource label (excluding the rows of $\alpha$ and $\beta$).

For example, the connectivity matrix of a J-HDG derived from above FIGS. 17A, B and C are as follows. As illustrated in FIG. 19, only two columns ($e_0$ and $e_1$) of the matrix representing FIG. 17 share a same resource label (R0). So that $c_1 = e_0 + e_1$ as shown in $C_{int\ erim}$. The final connectivity matrix, illustrated in FIG. 19, shows $C_{J\text{-}HDG}$ is the same as $C_{int\ erim}$ only with rows $\alpha$ and $\beta$ removed. Note that in FIG. 19, each column of matrix C represents a unique JDF resource, where each positive number indicates a producer of that resource and each negative number indicates a consumer of a same resource. If a JDF resource produced by a node $P_i$ is a shared output resources consumed by both nodes $P_k$ and $P_j$, for instance, then $c_{ij} = +2$, $c_{kj} = -1$ and $c_{ij} = -1$. Similarly, if a resource is produced by more than one nodes (i.e. $P_j$ and $P_k$ either through parallel paths if each node produce non-overlapped resource parts or through an exclusive path otherwise) but consumed by a node $P_j$, then $c_{ij} = +1$, $c_{kj} = +1$ and $c_{ij} = -2$. Except for resources that are the original inputs (e.g. R0 in this example) for a given workflow, all non-zero numbers in their columns of matrix $C_{J\text{-}HDG}$ are negative, while the final output resources (e.g. R4 of this example) are all positive numbers. Otherwise, the sum of all non-zero numbers in each column (intermediate resource) of matrix $C_{J\text{-}HDG}$ is zero.

FIG. 19 shows a connectivity matrix derived from a JDF workflow (provided in FIGS. 16A, B and C) at process execution level. The matrix can be properly transformed into a connectivity matrix of a higher level workflow (e.g. JDF process group level, intent level) through a matrix roll-up procedure defined as follows.

Definition 6:

A Matrix Roll-up Procedure is a process to construct a next level up connectivity matrix from a given connectivity matrix. There are two steps involved: (1) removes the columns that represent hidden edges in the next level up HDG (2) merge the rows that collide into one single node in the next level up HDG, by adding all relevant rows together. The resulting connectivity matrix keeps the same semantics as the original one.

FIG. 20 shows a connectivity matrix $C_{J\text{-}HDG}$ that is transformed from $C_{J\text{-}HDG}$ of FIG. 19 by applying the above matrix roll-up procedure. Similarly, the roll-up procedure can be applied to the example provided in FIGS. 17A, B and C. The corresponding connectivity Matrix $C_{R\text{-}HDG}$ with partitioned resources and $C_{R\text{-}HDG}$, is shown in FIG. 21.

J-HDG and R-HDG are intuitively dual forms of HDG, where J-HDG provides a job-centric view and R-HDG provides a resource-centeric view. Construction of a dual HDG (e.g. R-HDG) can be accomplished by transposing the connectivity matrix of the original HDG (e.g. J-HDG), and vice versa. In other words, $C_{J\text{-}HDG}$=transpose $(C_{R\text{-}HDG})$ or $C_{R\text{-}HDG}$-transpose $(C_{J\text{-}HDG})$ Definition 7:

The J-HDG->R-HDG transformation procedure has the following steps: (1) constructs the connectivity matrix of the original J-HDG, and (2) transpose the original connectivity matrix by switching the rows and columns; 3) each row is a node in R-HDG and each column is a label on a directed edge in R-HDG, where a negative number represents an incoming edge and a positive number represents an outgoing edge. The number itself represents the weight of edge and the weight of edge represents the number of resource instances involved.

Definition 8:

Similar to Definition 7, the R-HDG->J-HDG transformation procedure has the following steps: 1) Construct the connectivity matrix of the original R-HDG and (2) transpose the original connectivity matrix by simply switching the rows and columns; 3) each row is a node in J-HDG, and each column is a label on a directed edge in J-HDG, where a negative number represents an incoming edge and a positive number represents an outgoing edge and the number itself represents the weight of an edge; and 4) add external source node α and target node β to complete the graph.

Figure 22A:
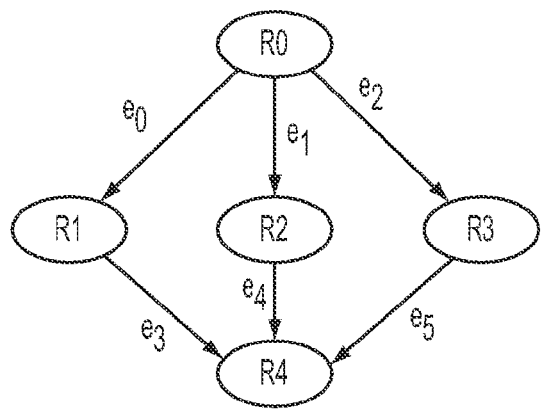
FIGS. 22A and B are transformed HDG's.
Figure 22B:
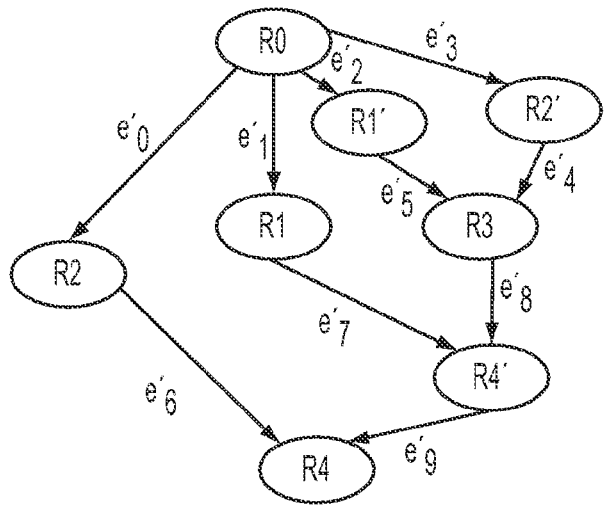
Figure 23:
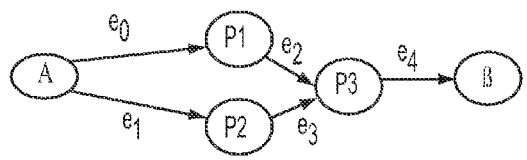
FIG. 23 is a transformed HDG.

FIGS. 22A and 22B illustrate R-HDGs transformed from J-HDGs of the example shown in FIGS. 16A, B and C. Similarly, FIG. 23 illustrates a J-HDG transformed from R-HDG of the example shown in FIG. 17. Note that in FIG. 22A and FIG. 22B, all resources are direct resources with no partition resources, but only R0, R1, R2, R3, and R4 are visible at top level (i.e. process group) workflow, while R1', R2' and R4' are resources internal to a specific process group. However, in FIG. 23, there are two levels resource structure but workflow structure is only one level (one topology but with different resource labels). It is possible for one workflow instance to contain both hierarchical job structure and hierarchical resource structure.

Representing JDF workflow structure in a formal graphical structure and its corresponding matrix allows a formal workflow analysis by means of rigorous analytical procedures rather than visual inspection and intuition. The theory of DAG and its applications (decision tree, Bayesian networks, machine learning, etc.) in many artificial intelligence fields provide a foundation for such a workflow analysis framework. The value of different abstractions in J-HDG and R-HDG is their visualization benefits and resulting HDG's which can be analyzed in the same way as the original HDG. This is a crucial feature because the operations and transformations used on a HDG, result in another HDG capable of analysis using the same core set of analytical procedures. This enables a variety of related representations of a given workflow.

The two HDGs described, J-HDG and R-HDG, provide orthogonal views for a given JDF workflow, and allow for an explicit representation of workflow components (i.e. process nodes and resources) and interactions among them. The HDG's are used to validate a given workflow, for example JDF. The validation process determines the following: cycling among components (i.e. deadlock); missing or tangling resource(s), etc. In addition, the HDG's provide a set of semantic-rich information with different abstractions for the MIS/Controller to facilitate JDF workflow execution and management. For example, if a process node is disabled, the HDG's enable an efficient determination of other processes unavailable to be executed. For another example, if a resource is not available, HDG's enable an efficient determination of other resources effected. These examples are not an exhaustive list.

As illustrated in FIGS. 16A, B and C, if process node P1 is disabled, then its J-HDG, P3, P4 and P5 cannot be executed due to the connectivity between them. On the other hand, if resource R1' is not available as determined from its R-HDG (shown in FIG. 22A and FIG. 22B, the effected resources are R3, R4' and R4. Based on the information provided through both J-HDG and R-HDG, the MIS/Controller can properly report a detailed status and adjust the execution accordingly.

In the following discussions, we concentrate on applying this set of semantic-rich information to intelligently handling failures/exceptions at run-time. This technique is applicable to general workflows and not limited to JDF workflows. A JDF process node is interchangeable with "task" as a general term.

The simple abortion of a crucial workflow in the presence of failures/exceptions can lead to significant disadvantages. Therefore, any workflow management system needs flexible mechanisms that deal with such failures/exceptions and guarantee the consistent and reliable execution of workflows. Failure/Exception handling in commercial workflow engines is mostly limited to transaction-based mechanisms that only ensure the recovery of persistent data after system failures (e.g. a system crash). This only permits a very rigid handling of expected failure. This disclosure provides more information about the inter-task (or inter-resources) dependencies (such as the connectivity information in J-HDG/R-HDG). As a result, a flexible failure handling strategy is achieved.

Figure 24:
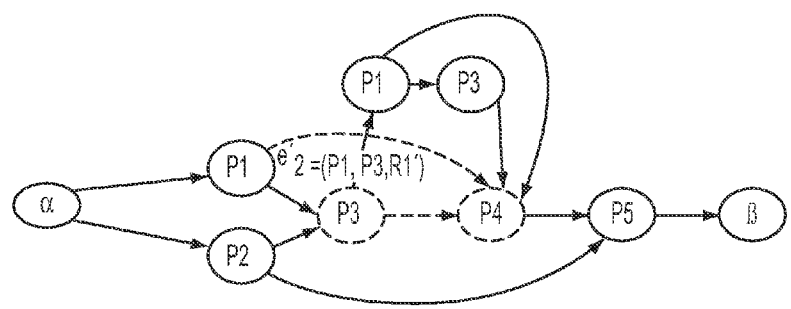
FIG. 24 is a block diagram of a recovered J-HDG.

For example, referencing workflow illustrated in FIG. 16A, assume process P3 fails because it needs a document resource (R1') that is not available. Referencing its J-HDG in FIGS. 16B and C or R-HDG in FIGS. 22A and B, process P1 is determined to be the producer of R1'; therefore, P1 is the root cause of this failure. Namely, the casual link of P3's J-HDG is e2=(P1, P3, R1') The system can determine this situation, it's root cause and construct a new execution path that will achieve the same goal of the workflow. In this example, the new execution path could involve the re-execution of process P1 shown in FIG. 24. Analyzing the J-HDG or R-HDG concludes the re-execution of P1 doesn't impact the status of process P2 and its corresponding resources. The remaining processes, such as P4 and P5, are executed after P3. Therefore, the "recovered" execution path maintains workflow consistence. In summary, this strategy uses the connectivity information provided in J-HDG or R-HDG and dynamically adjusts the remaining workflow execution path. This is more flexible and accurate than existing transaction-based mechanisms because it pinpoints the root cause of a failure.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A printing system job workflow analysis and control system, comprising:
   a plurality of printing devices, each printing device associated with one or more printing processes;
   a GUI (graphical user interface);
   a controller operatively connected to the printing devices and the GUI, the controller configured with instructions stored thereon, that when executed by the controller, enable the controller to perform functions comprising:
   receiving a JDF (Job Definition Format) data representation of a workflow including a plurality of print jobs to be executed by the printing system;
   accessing a knowledge database including service descriptions defining printing processes necessary to execute the respective services;
   performing a Hierarchical Dependence Graph representation of the workflow, including process and resource dependencies;
   performing an initial workflow analysis including a J-HDG, Definition 2, process-centric representation of the workflow, and a Connectivity Matrix of J-HDG, wherein the Connectivity Matrix transforms the J-HDG, Definition 2, representation to a J-HDG, Definition 6, representation;
   beginning the execution of the workflow based on the initial workflow analysis;

performing a dynamic workflow analysis during the execution of the workflow, the dynamic workflow analysis including the J-HDG, Definition 2, representation of the workflow, and the Connectivity Matrix of J-HDG, and adjusting the execution of the workflow based on the dynamic workflow analysis, wherein the J-HDG Definition 2 process-centric representation is defined as a HDG G=+V, E, where V={v|$v_i \in$ V, 1=1, . . . , |V|} is a set of vertex and E={e|$e_k \in$E, k=1, . . . |E|} is a set of directed edges, and JDF resources are vertices, the vertex incoming edges are JDF nodes which produce the JDF resources and the vertex outgoing edges are JDF nodes which consume the JDF resources.

2. A printing system job workflow analysis and control system, comprising:

a plurality of printing devices, each printing device associated with one or more printing processes;

a GUI (graphical user interface);

a controller operatively connected to the printing devices and the GUI, the controller configured with instructions stored thereon, that when executed by the controller, enable the controller to perform functions comprising:

receiving a JDF (Job Definition Format) data representation of a workflow including a plurality of print jobs to be executed by the printing system;

accessing a knowledge database including service descriptions defining printing processes necessary to execute the respective services;

performing a HDG (Hierarchical Dependence Graph) representation of the workflow, including process and resource dependencies;

performing an initial workflow analysis including a R-HDG (Resource Centric-Hierarchical Dependence Graph), Definition 3, resource-centric representation of the workflow, and a Connectivity Matrix of R-HDG, wherein the Connectivity Matrix is transformed into a connectivity matrix of a higher level workflow;

beginning the execution of the workflow based on the initial workflow analysis;

performing a dynamic workflow analysis during the execution of the workflow, the dynamic workflow analysis including the R-HDG, Definition 3, representation of the workflow, and the Connectivity Matrix of R-HDG, and adjusting the execution of the workflow based on the dynamic workflow analysis, wherein the R-HDG Definition 3 resource centric representation is defined as a HDG G=+V, E, where V={v|$v_i \in$V, 1=1, . . . , |V|} is a set of vertex and E={e|$e_{k\_} \in$E, k=1, . . . , |E|} is a set of directed edges, N represents a set of JDF nodes and R represents a set of JDF resources which can be directly linked with JDF nodes, and δ represents a set of resource precedence relations between partitioned resources, whereby providing V=R for any $e_k \in$E, $e_k=(v_i, v_j, \lambda_k)$ where $v_i, v_j \in$V are in-vertex and out-vertex of edge $e_k$ respectively, and $\lambda_k$ N Y δ.

3. A printing system job workflow analysis and control system, comprising:

a plurality of printing devices, each printing device associated with one or more printing processes;

a GUI (graphical user interface);

a controller operatively connected to the printing devices and the GUI, the controller configured with instructions stored thereon, that when executed by the controller, enable the controller to perform functions comprising:

receiving a JDF (Job Definition Format) data representation of a workflow including a plurality of print jobs to be executed by the printing system;

accessing a knowledge database including service descriptions defining printing processes necessary to execute the respective services;

performing a Hierarchical Dependence Graph representation of the workflow, including process and resource dependencies;

performing an initial workflow analysis including a J-HDG (Job Centric-Hierarchical Dependence Graph), Definition 2, process-centric representation of the workflow, a Connectivity Matrix of J-HDG, wherein the Connectivity Matrix is transformed into a connectivity matrix of a higher level workflow, and a R-HDG (Resource Centric-Hierarchical Dependent Graph), Definition 3, resource-centric representation of the workflow, and a Connectivity Matrix of R-HDG, wherein the Connectivity Matrix is transformed into a connectivity matrix of a higher level workflow;

beginning the execution of the workflow based on the initial workflow analysis;

performing a dynamic workflow analysis during the execution of the workflow, the dynamic workflow analysis including the J-HDG, Definition 2, representation of the workflow, a Connectivity Matrix of J-HDG, the R-HDG, Definition 3, representation of the workflow, and the Connectivity Matrix of R-HDG; and adjusting the execution of the workflow based on the dynamic workflow analysis, wherein the J-HDG Definition 2 process-centric representation is defined as a HDG G=+V, E, where V=(v|$v_i \in$V, 1=1, . . . , |V|} is a set of vertex and E={e|$e_k \in$E, k=1, . . . |E|} is a set of directed edges, and JDF resources are vertices, the vertex incoming edges are JDF nodes which produce the JDF resources and the vertex outgoing edges are JDF nodes which consume the JDF resources; and the R-HDG Definition 3 resource centric representation is defined as a HDG G=+V, E, where V={v|$v_i \in$V, 1= 1, . . . , |V|} is a set of vertex and E={e|$e_{k\_} \in$E, k= 1, . . . , |E|} is a set of directed edges, N represents a set of JDF nodes and R represents a set of JDF resources which can be directly linked with JDF nodes, and δ represents a set of resource precedence relations between partitioned resources, whereby providing V=R for any $e_k \in$E, $e_k=(v_i, v_j, \lambda_k)$ where $v_i, v_j \in$V are in-vertex and out-vertex of edge $e_k$ respectively, and $\lambda_k$ N Y δ.

* * * * *